(12) United States Patent
Muller et al.

(10) Patent No.: US 10,585,214 B2
(45) Date of Patent: Mar. 10, 2020

(54) NEAR-EYE FOVEAL DISPLAY

(71) Applicant: SoliDDD Corp., Brooklyn, NY (US)

(72) Inventors: Richard A. Muller, Berkeley, CA (US); Neal Weinstock, Brooklyn, NC (US)

(73) Assignee: SOLIDDD CORP., Brooklyn, NY (US)

( * ) Notice: Subject to any disclaimer, the term of this patent is extended or adjusted under 35 U.S.C. 154(b) by 260 days.

(21) Appl. No.: 15/671,694

(22) Filed: Aug. 8, 2017

(65) Prior Publication Data
US 2018/0329119 A1   Nov. 15, 2018

Related U.S. Application Data

(63) Continuation-in-part of application No. 15/594,029, filed on May 12, 2017.

(51) Int. Cl.
*G02B 3/00* (2006.01)
*G02B 27/01* (2006.01)

(52) U.S. Cl.
CPC ....... *G02B 3/0056* (2013.01); *G02B 27/0172* (2013.01); *G02B 2003/0093* (2013.01)

(58) Field of Classification Search
CPC ............ G02B 27/0172; G02B 27/2214; G02B 27/0955; G02B 27/0961; G02B 27/0093; G02B 2027/1078; G02B 3/0056
USPC ................. 359/463, 462, 466, 467
See application file for complete search history.

(56) References Cited

U.S. PATENT DOCUMENTS

| 5,883,606 A | * | 3/1999 | Smoot | ................. G02B 27/017 345/7 |
| 2017/0115432 A1 | * | 4/2017 | Schmidtlin | ........ G02B 27/0172 |

FOREIGN PATENT DOCUMENTS

JP    2004195676 A    7/2004

OTHER PUBLICATIONS

International Search Report for PCT Application No. PCT/US2018/032350, dated Aug. 8, 2018, 5 pages.
Hao LV et al., "Fabrication and performances analysis of ball lenses", Dept. of Physics, Xiogan University, Xiogan, China, 4 pages.

* cited by examiner

*Primary Examiner* — Robert E. Tallman
(74) *Attorney, Agent, or Firm* — Ference & Associates LLC

(57) ABSTRACT

An apparatus and system for a display screen for use in near-eye display devices. Small light emitting devices are placed behind a plurality of light-directing beads. The light emitting devices and light-directing beads for a display device and system placed in front of a user for near-eye display. This allows a user to experience near-eye display with greater resolution, wider field of view and faster frame rate. Other embodiments are described herein.

20 Claims, 4 Drawing Sheets

NEAR-EYE FOVEAL DISPLAY

CROSS-REFERENCE TO RELATED APPLICATIONS

This application is a continuation-in-part of U.S. application Ser. No. 15/594,029, filed May 12, 2017, the contents of which are incorporated by reference herein.

FIELD OF THE INVENTION

The present invention relates generally to display systems, and, more particularly, to display systems for near-eye displays such as virtual reality and augmented reality.

BACKGROUND OF THE INVENTION

Recently, there has been significant growth in the use and advancement of virtual reality, augmented reality, and similar near-eye products. Common virtual reality uses include video gaming, movies, amusement ride simulators, and the like. While the popularity is driven by entertainment, the products also serve functions in training and education. For example, virtual reality headsets may be used for flight simulation training, surgery simulation for physicians, technology in the traditional classroom to spark student interest in a subject, and the like.

One method of producing a virtual reality simulation is the use of a headset. The headset contains a display with lenses placed between the eyes and display. The lenses serve to focus and reshape the image perceived by the eyes. In this manner, a 3-dimensional image is formed from 2-dimensional images from the display screen.

However, these virtual reality headsets are large in size and heavy in weight. The requirement of having a display screen a fixed distance from a user's eyes with a lens between the display and eyes requires a certain distance. Additionally, the optical components, as well as computational machinery and electronics, are bulky and heavy. Also, many conventional virtual reality headsets require another device, such as the user's smartphone, to be placed in the apparatus. Many headsets do not include a display device dedicated to the apparatus.

Even more limiting, conventional near-eye displays involve a three-way tradeoff between field of view, image resolution, and frame rate; as each of these three beneficial features may be expanded, it comes at the expense of the others in terms of optical design and computational power. Therefore, systems typically compromise all three and end up with frame rate that is so slow that images lag, resolution so slow that the display has a "screen door effect" (i.e. individual pixels can be seen rather than a smooth "retinal display"), and field of view is very limited.

What is needed is a way for high resolution displays with a wide field of view and fast frame rate to be integrated into near-eye viewing systems, such as a virtual reality headset, to improve the viewing experience. Such a device is referred to herein as a foveal display because it achieves its effects by focusing light directly into the fovea of the viewer's eyes.

SUMMARY OF THE INVENTION

In accordance with the present invention, a method and system uses a plurality of light-emitting devices behind a plurality of light-directing beads or microlenses in relation to a user's eye. The device is called a foveal display because it focuses light directly and precisely into the fovea of the viewer's eyes. The device replaces the typical optics in a bulky and cumbersome virtual reality (VR) headset. The device, or foveal display, allows for high resolution display in a lightweight device that gives the user a wide-angle view and rapid frame rate.

The device may be a flat panel or curved panel display. Each of the light-directing microlenses or beads is associated with at least one pixel-generating device. For ease of readability, the term lens or lenses will be used here throughout. However, it should be understood that lens, lenses, microlenes, and/or beads refer to the same structure within the device. The light-directing lenses may be of a shape that allows the lens to properly direct light from the light-emitting device to the user's fovea. The lenses may be in an interlocking configuration or spaced apart with gaps there between.

A processor controls the focus of the device. The focus may be adjusted based upon user preferences. Alternatively, the processor can automatically change the focus. The device may be deployed either in a large panel or in a near-eye display in either a flat panel or curved display that follows the curvature of the eye. The present device offers advantages to the use of traditional near-eye displays due to lightweight construction, high resolution, fast frame rate, extremely wide field of view, and reduced need for a secondary display device. In a flat panel display, the present device offers advantages in showing an extremely wide field of view for autostereo 3-dimensional (3D) display.

In summary, one aspect provides a device, comprising: a plurality of light-directing beads, wherein the beads are arranged in a pattern having a first dimension and a second dimension, wherein the first dimension comprises a horizontal dimension and wherein the second dimension comprises a vertical dimension; and a display comprising a plurality of pixels, wherein the display is arranged behind the plurality of light-directing beads in relation to a human eye; wherein each of the plurality of light-directing beads is associated with at least one of the plurality of pixels.

Another aspect provides a system, comprising: at least one processor; a power source operatively coupled to the processor; a plurality of light-directing beads, wherein the beads are arranged in a pattern having a first dimension and a second dimension, wherein the first dimension comprises a horizontal dimension and wherein the second dimension comprises a vertical dimension; and a display operatively coupled to the at least one processor and the power source and comprising a plurality of pixels, wherein the display is arranged behind the plurality of light-directing beads in relation to a human eye; wherein each of the plurality of light-directing beads is associated with at least one of the plurality of pixels; and wherein the plurality of light-directing beads direct light produced by the display to a user's eye to generate a perceived image.

A BRIEF DESCRIPTION OF THE DRAWINGS

DETAILED DESCRIPTION OF THE INVENTION

Figure 1:
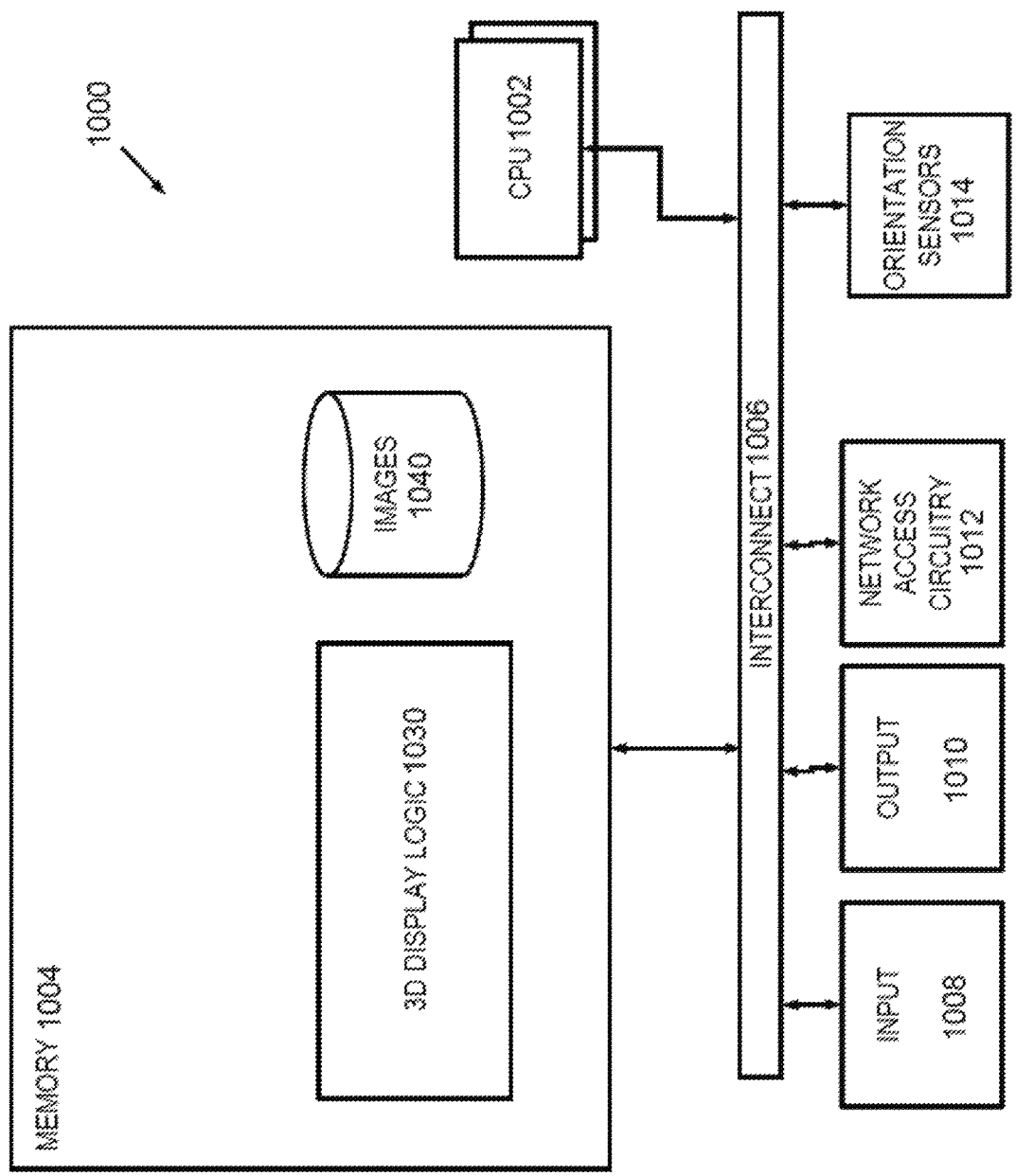
FIG. 1 is a block diagram showing an example apparatus device.

In accordance with the present invention, an embodiment provides a method and system of providing a high-resolution near-eye display. The system provides for a near-eye display without the large and cumbersome headsets found in conventional virtual reality headsets. The apparatus comprises a plurality of light-directing beads or microlenses. Reference in this application to the light-directing lenses may also be called light-directing beads or beads for brevity and ease of reading. The bead's shape may include fish-eye, spherical, ovoid, hexagonal, square, columnar, triangular, or like 3-dimensional shapes or like cross dimensional shapes. The term bead should not be construed as referring only to a spherical structure, although spherical beads may be an embodiment. Bead shapes in figures are illustrative only of an embodiment. Each of the disclosed beads shapes may have a different refractive index in different embodiments. The lenses are arranged in a pattern having a first dimension and a second dimension. The first dimension may include a horizontal dimension and the second dimension may include a vertical dimension, for example, as in a matrix or grid-like pattern. Alternatively, the pattern having the first dimension and a second dimension may not be in a grid-like pattern but may instead include a different pattern structure, for example, a brick-like pattern structure, an alternating pattern structure, or the like.

The apparatus may also include a display comprising a plurality of pixels, for example, a plurality of light emitting devices, a printed image of sufficiently high resolution, or the like. The display may be arranged behind the plurality of light-directing lenses in relation to a human eye. For example, from the perspective of the eye, the light-directing lenses may be closest to the eye and the display may be behind the light-directing lenses. Each of the plurality of light-directing lenses may be associated with at least one light-emitting device or pixel of the printed image of sufficiently high resolution. In other words, for each light-directing lens, the device may have a corresponding light-emitting device or static printed image.

The device comprises a matrix of lenses around the eye enabling a user to focus on pixels from a light-emitting device, or a reflective image, and associated pixel behind the lenses in relation to the user's eye. The lenses may be of a glass or plastic material, with the preferred index of refraction in the 2.0 to 2.1 range. In an embodiment, the lenses or beads may be of a fish-eye shape having a refractive index of about 1.5. This relatively high index of refraction may be achieved by using glass, plastic, or the like, and may include specialized additives, such as are commonly used in retroreflective beads, or by placing the microlens array around, or in front and/or back of a material with high refractive index such as a cholesteric liquid crystal cell. As should be understood by one skilled in the art, these examples of materials with high refractive indices are merely examples and are not meant to be limiting as other materials or combination of materials to achieve a high refractive index are possible and contemplated.

Referring to FIG. 1, a device 1000, for example, that which is used for the viewing apparatus, is described. The device 1000 includes one or more microprocessors 1002 (collectively referred to as CPU 1002) that retrieve data and/or instructions from memory 1004 and execute retrieved instructions in a conventional manner. Memory 1004 can include any tangible computer readable media, e.g., persistent memory such as magnetic and/or optical disks, ROM, and PROM and volatile memory such as RAM.

CPU 1002 and memory 1004 are connected to one another through a conventional interconnect 1006, which is a bus in this illustrative embodiment and which connects CPU 1002 and memory 1004 to one or more input devices 1008 and/or output devices 1010, network access circuitry 1012, and orientation sensors 1014. Input devices 1008 can include, for example, a keyboard, a keypad, a touch-sensitive screen, a mouse, and a microphone. An embodiment may include an input device such as a camera or photosensor used for eye-tracking. Eye tracking that is then associated with computer-activation of particularly chosen pixels is a typical implementation of the invention when used in a near-eye display. Output devices 1010 can include a display—such as an OLED (organic light-emitting diode), a microLED, or liquid crystal display (LCD), or a printed image of sufficiently high resolution—and one or more loudspeakers. Network access circuitry 1012 sends and receives data through computer networks. Orientation sensors 1014 measure orientation of the device 1000 in three dimensions and report measured orientation through interconnect 1006 to CPU 1002. These orientation sensors may include, for example, an accelerometer, gyroscope, and the like, and may be used in identifying the position of the user.

Information handling device circuitry, as for example outlined in FIG. 1, may be used in devices such as virtual reality, augmented reality, tablets, smart phones, personal computer devices generally, and/or electronic devices which may provide near-eye displays screens to a user.

Figure 2:
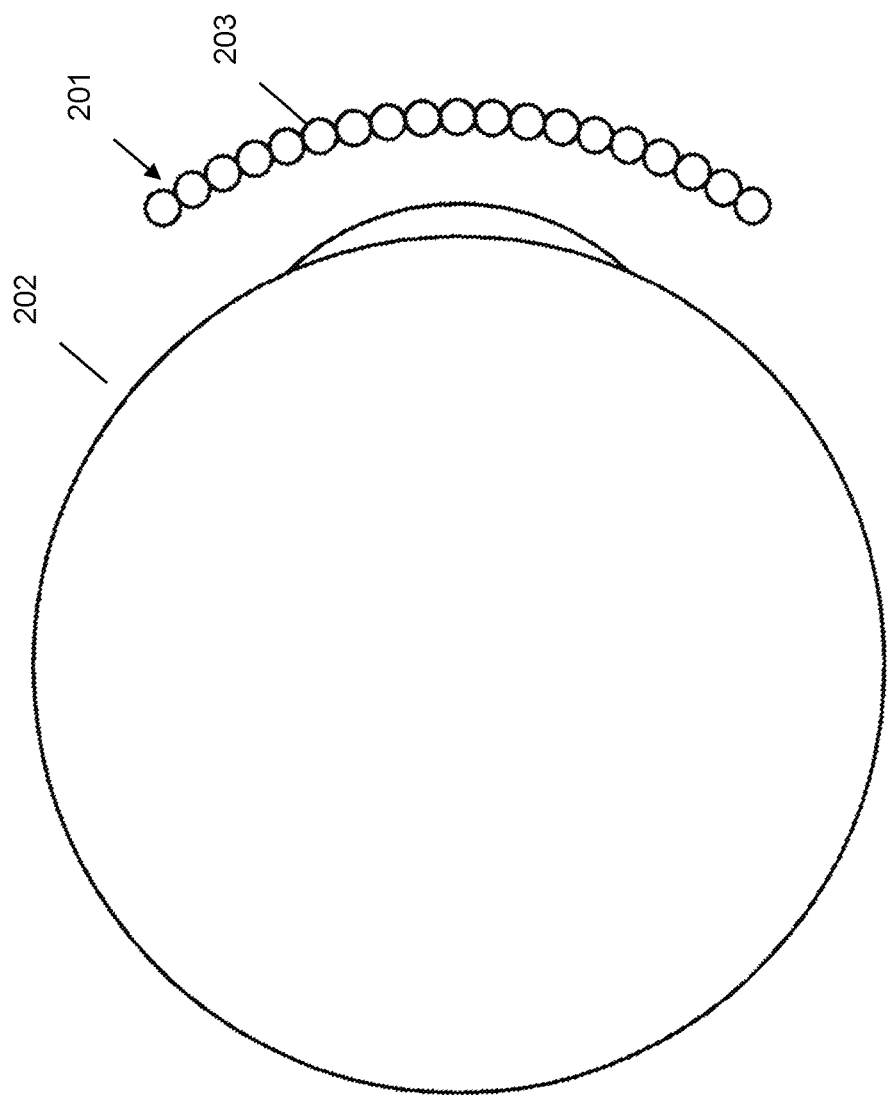
FIG. 2 is a structural diagram showing a side view of the layers of a near-eye display in an embodiment.

Referring now to FIG. 2, an embodiment of a foveal display 201 is shown in a side view. In an embodiment the overall device may be spherical in shape, that is, the overall construction of matrixed spherical beads would be shaped into a portion of a sphere surrounding the eye 202. An embodiment comprises a plurality of light-directing beads or microlenses 203 that are arranged in a pattern having a first dimension and a second dimension. The first dimension may include a horizontal dimension and the second dimension may include a vertical dimension. As discussed above, the pattern may include a matrix pattern, grid pattern, brick-like pattern, alternating pattern, pattern having spaces between the beads, or the like. For example, the light-directing beads may include small spheres or beads. In one example, the beads may be very small and have a diameter of 3.6 millimeters or 3600 microns. In such an example, the pixel separation is 3600/3600 or 1 micron, resulting in a grid-like or brick-like pattern having spaces between the beads and, accordingly, between the pixels.

An embodiment may include a display comprising a plurality of light-emitting devices. The light-emitting devices may include a display, for example, as in a television or other picture producing display. Each light-emitting device may correspond to a single pixel or group of pixels of a display. For example, as in a television, each pixel is generated using a light-emitting device. The display is arranged behind the plurality of light-directing lenses in relation to a human eye. An embodiment may include at least one light-emitting device corresponding to each of the plurality of lenses. For example, the device may include the same number of light-emitting devices as the number of lenses. Each light-emitting device may have a corresponding lens in which the light of the light-emitting device may be directed. The light-emitting device may be a light-emitting diode (LED), micro LED, organic light-emitting diode (OLED), active-matrix organic light-emitting diode (AMO-LED), or the like. The light-emitting devices may be as small in size as 3,000/inch or about 8 microns in size.

In one embodiment, rather than a light-emitting device, the system may include a printed image of sufficiently high resolution affixed to the back side of the lenses as viewed by a user's eye. Each pixel or a group of pixels of the image may correspond to a lens. For example, each lens may "display" a pixel or group of pixels of the image. In other words, as a user is looking through the lens, the user will see the corresponding pixel or group of pixels through a single lens. Thus, as the user is looking through the plurality of lenses, the user can see the image. For ease of readability, the term light-emitting device will be used throughout. However, the use of a printed image is possible and is not intended to be excluded from the discussion herein.

The plurality of light-directing lenses properly direct light from light-emitting devices or direct the pixels of the image to the user's eye. In other words, as the user is looking through the lenses, the lenses may direct the light or images in a manner which provides the user with a view of single image. The light-directing lenses may be of any shape, for example, essentially spherical shape (albeit in many implementations with sides and rear section shaved off to fit more closely together or fit better to the underlying display while still maintaining a spherical back surface for the critical section of the lens that must focus on the appropriately viewed pixels) that allows the light from the light-emitting device or printed image of sufficiently high resolution to be properly directed to the user's eye. Reference in this application to the light-directing lenses may also be called beads for brevity and ease of reading. The bead's shape may include fish-eye, spherical, ovoid, hexagonal, square, columnar, triangular, or like 3-dimensional shapes or like cross dimensional shapes. A display may comprise a mix of different bead shapes. Different beads shapes may be arranged either in groups of like beads or interspersed with different bead shapes mixed together. Beads may be arranged such that the beads interlock, or may have gaps formed by edges of adjacent beads.

Figure 3:
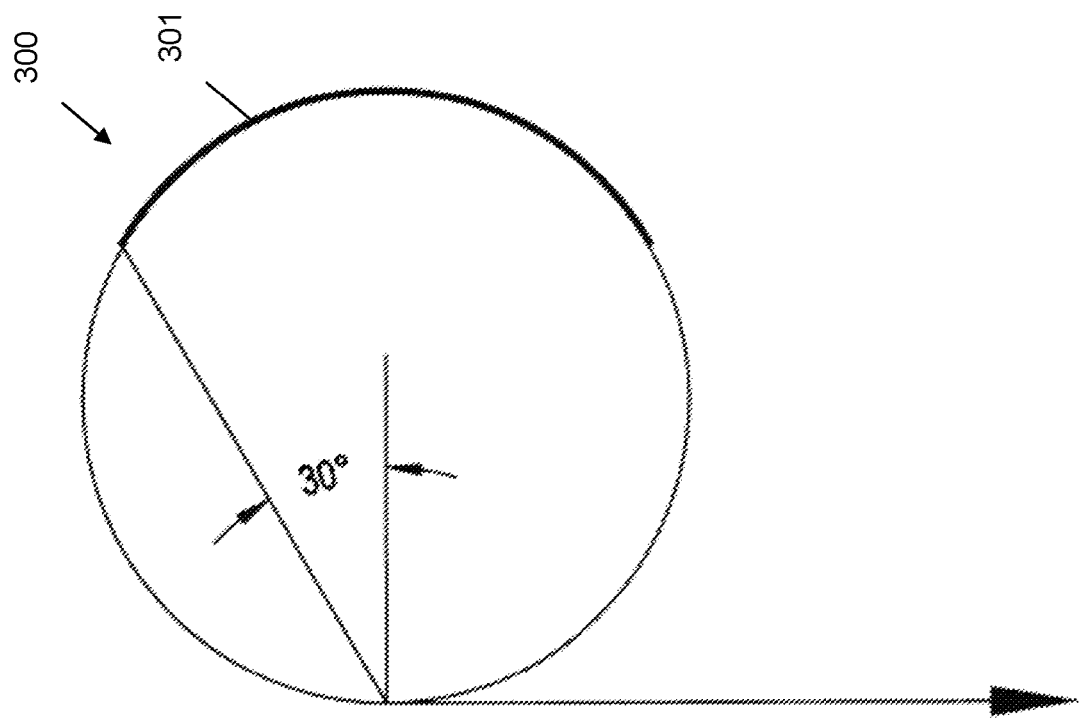
FIG. 3 is a structural diagram showing a detailed side view of the layers of a near-eye display in an embodiment.
Figure 4:
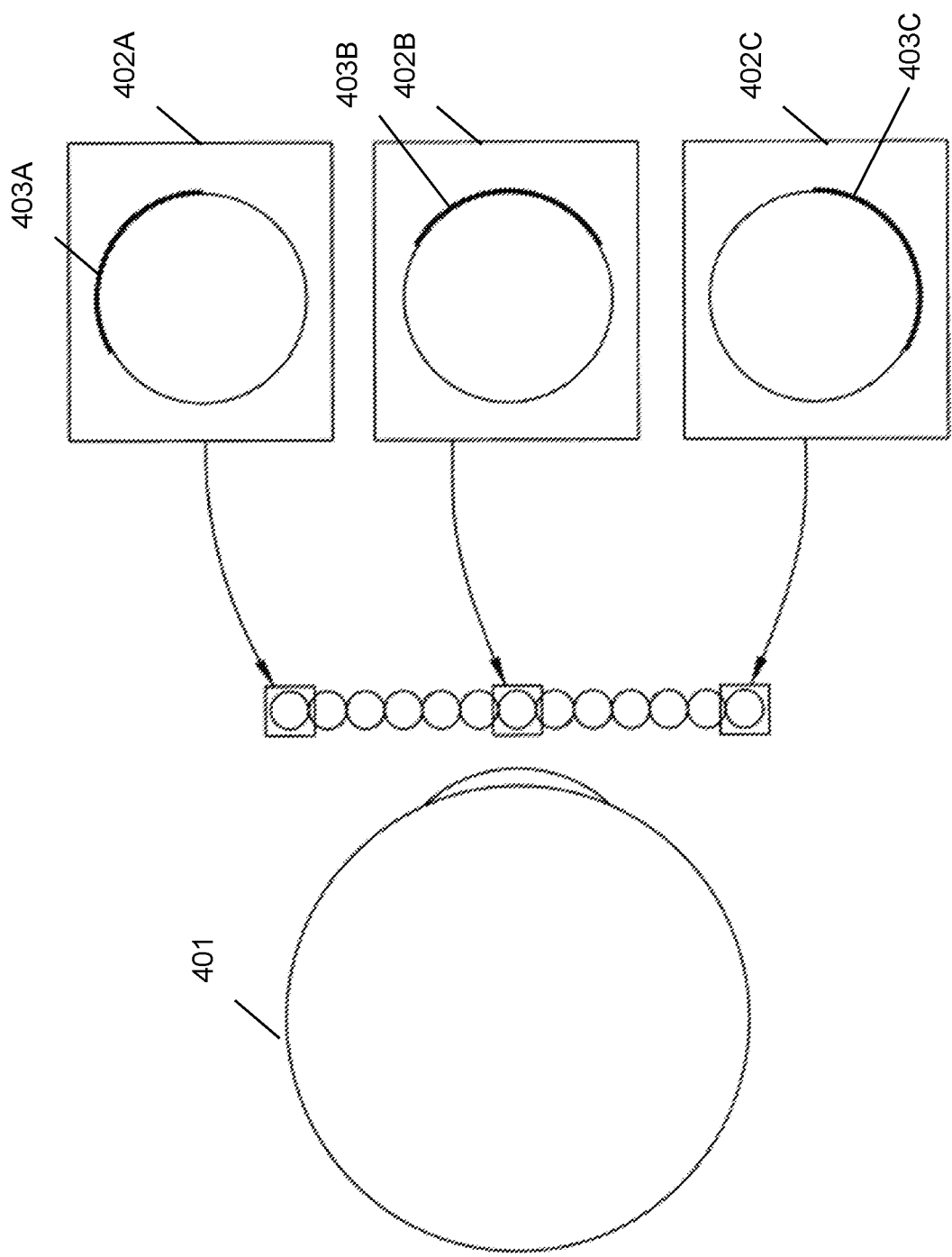
FIG. 4 is a structural diagram showing a detailed side view of the near-eye display in an embodiment.

Referring now to FIG. 3, an embodiment of one of the beads 300 of the device is shown in a side view. An embodiment shows the maximum area 301 behind each bead which needs to be spherical and covered by pixels in a display, for example, in this use case, the maximum area behind each bead can be identified using the equation $\sin \theta = 1/n = 1/2$, which equates to $\theta = 30$ degrees. Different sizes of beads, numbers of beads, and the like, may change the area covered by each bead. FIG. 4 illustrates the maximum area behind different beads of the device. As the user's eye 401 focuses on a particular bead, 402A-402C as examples, each bead only needs to provide a maximum predetermined area 403A-403C for focusing. In other words, based upon the angle of the eye with respect to the bead, the eye could only focus on a particular area behind the bead, as opposed to the entire angle behind the bead.

For the beads, an embodiment comprises light-emitting devices or a printed image of sufficiently high resolution behind the plurality of beads. There is at least one light-emitting device for each of the beads. The light-emitting device may cover the entire adjacent surface of a bead. Alternatively, the light-emitting device may only partially cover the adjacent side of a bead.

Brewster's angle, or the polarization angle, is the angle of incidence at which light is transmitted perfectly through a transparent surface with no reflection. Lenticular crosstalk occurs when a portion of the display may be visible at multiple locations. Reduction or complete elimination of lenticular crosstalk provides a display with higher resolution. Selection of a proper shape, and thus a proper light-directing bead, reduces this lenticular crosstalk because light from the light-emitting device bends in a pattern to the user's eye. United States Patent Publication No. 2015/0015946 describes this method for minimizing lenticular crosstalk, and is incorporated by reference in its entirety herein.

The pixel separation on the back of the device is set by the angular resolution required, and multiplied by the thickness of the device. In an embodiment the device is a flat panel, rather than the sphere shape as discussed above. For example, in a flat panel with true retinal imaging, the angular resolution would be 1 minute of arc=1/3600 radians. In this example, only the pixel located at that precise view needs to be in sharp focus or updated with a very rapid refresh rate, and other pixels surrounding the pixel located in precise view will be seen by the eye in very soft focus (if at all), and thus may be provided less information by the computing system that feeds the display. Thus, the system can be designed with a processor having less processing power than if all pixels need to be in sharp focus at all times.

Using the example discussed above, the light-directing beads may include small spheres or beads. In one example, the beads may be very small and have a diameter of 3.6 millimeters or 3600 microns. In such an example, the pixel separation is 3600/3600 or 1 micron, in order to yield a system with resolution equal to 1 minute of arc. In an embodiment, the device size may be increased or the resolution decreased. A larger device may increase the total weight and power consumption of the device, but offers additional benefits such as a larger viewing area.

For some examples, see the following table:

TABLE 1

| Pixel Size | Focus Length | Resolution |
| --- | --- | --- |
| 8 microns | 3 mm | 14 minutes of arc |
| 8 microns | 10 mm | 4.3 minutes of arc |
| 8 microns | 30 mm | 1.4 minutes of arc |
| 4 microns | 10 mm | 2 minutes of arc |
| 4 microns | 20 mm | 1 minute of arc |

In an embodiment, the beads may be shaved, ground, molded, or the like, to a planar surface. The flat portion of the bead is adjacent to the light-emitting device. The flat portion allows proper light transmittance from the light-emitting device to the bead.

In an embodiment, the spherical beads may be replaced by simple fish-eye lenses (i.e. super-wide-angle lenses) with focal length equivalent to that required for the spheres. This would allow the surface of the lens adjacent to the display to be flat. Also, with a fish-eye the optics of the lenses may be designed, as understood by those in the art, such that the lenses focus directly on the flat back surface without requiring such a high index of refraction as the spherical lenses require. In an embodiment, a fish-eye lens may have an index of refraction of around 1.5. The fish-eye lens design may be optimized to allow materials with a lower index of refraction to focus on its backplane. In an embodiment, the fish-eye lens may be made of glass or plastic.

In an embodiment, gaze tracking may be integrated into the device. The gaze tracking determines the user's gaze position or where the user is focusing upon the device. The gaze tracking performs two functions. First, the gaze tracking allows processor resources to be conserved in areas of the device where the user is not focusing user gaze. Second, the gaze tracking allows for greater resolution and processor resources to be used in areas where the user gaze is focused. The gaze tracking system may allow for greater visual resolution in areas of user gaze while simultaneously lowering power consumption and processor resources in device areas not in the user gaze. The gaze tracking input device is operatively coupled to a processor which may or not be the same processor operatively coupled to one or more light-emitting device(s).

Minimal power consumption reduces the required power supply needed. This reduces the weight of the device. Reduction in power is important for a device that may be a portable electronic device such that the user may not need to carry extra batteries or may not need to keep the device connected to a charger or external power supply.

Minimal power consumption and the resulting reduction of power storage and supply also keep the weight of the device minimal. Since the device may be used in near-eye display devices, the apparatus is typically worn on the head. The reduced weight minimizes the bulk of the unit, reduces muscle strain, and allows the user greater range of motion when using the device. An embodiment of the device resembles swim goggles and provides an improvement over typical VR display hoods.

In an embodiment, there may be a user controlled knob, switch, or the like that allows a user to adjust the focus of the apparatus. The user may control the focus based on a user preference. In another embodiment, a processor may control the focus of the device.

In an embodiment, the light-directing beads (or fish-eye lenses) may be coated with an additional layer. These layers may include anti-scratch, anti-glare, water repellant, light reflective, and photosensitive or thermal-sensitive darkening coatings.

In the application, reference to "a processor" may control the focus of the foveal display device, control a single light-emitting device, control a plurality of light-emitting devices, control the interaction of the foveal display with other components of the device, or any combination of processing performed by the device in part or in whole.

A number of components of the device 1000 are stored in memory 1004. In particular, 3D display logic 1030 is all or part of one or more computer processes executing within CPU 1002 from memory 1004 in this illustrative embodiment but can also be implemented, in whole or in part, using digital logic circuitry. As used herein, "logic" refers to (i) logic implemented as computer instructions and/or data within one or more computer processes and/or (ii) logic implemented in electronic circuitry. Image 1040 is data representing one or more images and/or views which may be stored in memory 1004.

The above description is illustrative only and is not limiting. The present invention is defined solely by the claims which follow and their full range of equivalents. It is intended that the following appended claims be interpreted as including all such alterations, modifications, permutations, and substitute equivalents as fall within the true spirit and scope of the present invention.

What is claimed is:

1. An apparatus, comprising:
a plurality of light-directing beads, wherein the beads are arranged in a pattern having a first dimension and a second dimension, wherein the first dimension comprises a horizontal dimension and wherein the second dimension comprises a vertical dimension, wherein each of the plurality of light-directing beads has a single index of refraction; and
a display comprising a plurality of pixels, wherein the display is arranged behind the plurality of light-directing beads in relation to a human eye;
wherein each of the plurality of light-directing beads is associated with at least one of the plurality of pixels of the display and wherein a portion of the display is visible through one of the plurality of light-directing beads providing a high resolution view of the display having a wide field of view.

2. The apparatus of claim 1, wherein the beads are selected from the group consisting of: fish-eye beads, elongated spherical beads, and hexagonal beads.

3. The apparatus of claim 1, wherein the beads comprise a microlens array.

4. The apparatus of claim 1, wherein the pattern having the first dimension and the second dimension is arranged to follow the curvature of a human eye.

5. The apparatus of claim 1, wherein each of the plurality of light-directing beads is associated with more than one light emitting device.

6. The apparatus of claim 1, wherein the plurality of pixels comprise a plurality of light emitting devices.

7. The apparatus of claim 1, wherein the pattern comprises an interlocking pattern.

8. The apparatus of claim 1, wherein each of the plurality of light-directing beads comprises a flat side adjacent to the display.

9. The apparatus of claim 1, wherein each of the plurality of light-directing beads comprise an index of refraction of two.

10. The apparatus of claim 1, wherein the bead is co-located with a panel, wherein the panel comprises a material allowing a focal ray of emitted light to pass through the combination of the panel and the bead and wherein the combination of the panel and the bead has an index of refraction of substantially two.

11. A near-eye display system, comprising:
at least one processor;
a power source operatively coupled to the processor;
a plurality of light-directing beads, wherein the beads are arranged in a pattern having a first dimension and a second dimension, wherein the first dimension comprises a horizontal dimension and wherein the second dimension comprises a vertical dimension, wherein each of the plurality of light-directing beads has a single index of refraction; and
a display operatively coupled to the at least one processor and the power source and comprising a plurality of pixels, wherein the display is arranged behind the plurality of light-directing beads in relation to a human eye;
wherein each of the plurality of light-directing beads is associated with at least one of the plurality of pixels of the display and wherein a portion of the display is visible through one of the plurality of light-directing beads providing a high resolution view of the display having a wide field of view; and
wherein the plurality of light-directing beads direct light produced by the display to a user's eye to generate a perceived image.

12. The system of claim 11, further comprising a gaze tracking device for tracking a gaze of a user, wherein the display is controlled based upon a location of the gaze of the user.

13. The system of claim 11, wherein the beads comprise elongated spherical beads.

14. The system of claim 11, wherein the beads comprise fish-eye beads.

15. The system of claim 11, wherein the pattern having the first dimension and the second dimension is arranged to follow the curvature of a human eye.

16. The system of claim 11, wherein each of the plurality of light-directing beads is associated with more than one light emitting device.

17. The system of claim 11, wherein the plurality of light emitting devices comprise a plurality of light emitting diodes.

18. The system of claim 11, wherein the pattern comprises an interlocking pattern.

19. The system of claim 11, wherein each of the plurality of light-directing beads comprises a flat side adjacent to the display.

20. The system of claim 11, wherein each of the plurality of light-directing beads comprise an index of refraction of substantially 1.5.

* * * * *